June 30, 1925.
F. W. MERRILL
1,543,863
METHOD AND APPARATUS FOR ELECTRICAL REGULATION
Filed Aug. 24, 1921
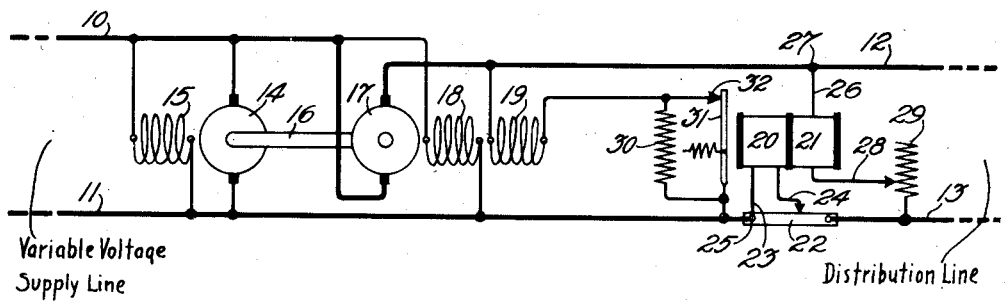
Inventor:
Frank W. Merrill
by Hubert A. Pattison
Att'y.

Patented June 30, 1925.

1,543,863

UNITED STATES PATENT OFFICE.

FRANK W. MERRILL, OF EAST ORANGE, NEW JERSEY, ASSIGNOR TO WESTERN ELECTRIC COMPANY, INCORPORATED, OF NEW YORK, N. Y., A CORPORATION OF NEW YORK.

METHOD AND APPARATUS FOR ELECTRICAL REGULATION.

Application filed August 24, 1921. Serial No. 494,921.

*To all whom it may concern:*

Be it known that I, FRANK W. MERRILL, a citizen of the United States of America, residing at East Orange, in the county of Essex and State of New Jersey, have invented certain new and useful Improvements in Methods and Apparatus for Electrical Regulation, of which the following is a full, clear, concise, and exact description.

This invention relates to a method and apparatus for electrical regulation and has particular reference to a reciprocating booster system which automatically maintains the voltage of a distribution circuit at a desired value.

The primary object of the invention is to provide a smoothly operating system which is sufficiently flexible to respond instantaneously to every degree of variation in the voltage of a supply circuit so as to maintain the voltage of a distribution circuit substantially constant.

A further object of the invention is to provide the above regulating system with a load compensating device which upon increase of the load in the distribution circuit will operate to increase the voltage of said circuit a predetermined amount above the light load regulating point. Means are provided for adjusting this load compensating device.

Another object of the invention is to provide an apparatus which operates continuously but which functions in its regulative capacity only when an adjustment in the voltage of the distribution circuit is required. The advantage of this feature is that both the time and energy which would otherwise be necessary for rapidly starting and stopping the apparatus are economized.

A still further object of the invention is to provide a dynamo electric machine the strength and polarity of whose field may be determined and controlled by varying the strength of one of two differential windings which comprise the field.

More specifically the invention relates to a balancing or reciprocating booster system comprising a pair of shunt wound dynamo electric machines which are mounted upon a common shaft, and which function together as a motor generator unit. Either machine may operate as a motor to drive the other as a generator without change in the direction of rotation of the two machines. One of the machines has a single shunt field winding and is connected across the two main leads of the supply circuit, whereas the other machine is in series in the branch or distribution circuit and has two differentially wound shunt field coils. One of these field coils has in its circuit a voltage regulator which is responsive to the voltage and the current of said distribution circuit. The voltage regulator is connected so as to vary the amount of resistance in series with this field coil and to thus control its magnetomotive force. The range of this control is such that the ampere turns of the regulated coil may be made less than, equal to, or greater than those of the other of said differential coils according as the voltage of the supply circuit is greater than, equal to, or less than the regulated voltage of the distribution circuit.

The accompanying drawing illustrates a preferred embodiment of the invention.

Referring to the drawing in detail, an electrical supply circuit having leads 10, 11, upon which a varying potential is impressed, furnishes energy through the improved regulating system to a distribution circuit whose leads are shown at 12 and 13. This circuit serves to energize a series of motors or equivalent translating devices (not shown) the combined power demands of which create a variable demand for power in the circuit. The improved regulating system comprises the following: a dynamo electric machine having its armature or rotor 14 bridged across the leads of the supply circuit and provided with a shunt winding 15 which enables it to rotate in the same direction while functioning either as a motor or a generator. Mechanically connected to the rotor 14 by means of shaft 16, or other suitable means, is a second rotor 17 which is energized in series with the distribution circuit. Two differentially wound shunt fields 18 and 19 cooperating with the armature 17 are energized from the supply and distribution ends of the circuits respectively. With the same applied voltage coil 19 has approximately 2½ times the number of ampere turns of coil 18 for reasons which will be explained hereinafter. In the circuit of the coil 19 is a voltage regulator having two differentially connected actuating windings 20 and 21. The winding 20 is energized from a shunt in the distribution circuit, having one lead 23 attached to a fixed contact 25 and the other lead 24 adjustably connected to a metal bar 22. The second winding 21 has one of its leads 26 permanently attached to lead 12 of the distribution circuit at a point 27 and its other lead 28 attached to lead 13 of the distribution circuit through an adjustable resistance 29. Armature 31 of the voltage regulator vibrates rapidly across a resistance 30 in series with coil 19 in a well-known manner, varying the current in coil 19 so as to maintain the resultant flux of coils 20 and 21 of the voltage regulator substantially constant.

The operation of the system is as follows: The rotors 14 and 17 operate continuously in one direction. When the voltages of the supply and distribution ends of the circuits are equal, armature 17 will be generating just enough voltage to overcome the drop through its winding and brush contacts, while armature 14 will draw only sufficient power from the supply service to overcome the losses of the set and to supply the small amount of energy needed for the generator action of armature 17. If the voltage of the supply service now decreases below the regulating point for which the voltage regulator is set, the distribution circuit voltage will decrease very slightly allowing armature 31 to remain in contact with point 32 for a longer period of time in its vibrations, thus strengthening field 19 and causing armature 17 to generate sufficient voltage to make up for the decrease of the voltage in the supply service. Armature 14 will draw sufficient additional energy from the supply line to enable it to drive armature 17 with its increased load. The speed of the set will decrease slightly. On the other hand, if the voltage of the supply service increases above the regulated point, the voltage of the distribution circuit will increase very slightly causing armature 31 to remain out of contact with point 32 for a longer time in its vibrations, weakening field 19 until its magneto motive force is less than that of coil 18. The resulting flux of the series unit of the regulating set will then reverse, causing armature 17 to generate a voltage counter to that of the supply service. The series unit of the set thus becomes a motor and the speed of the set rises, causing armature 14 to general a voltage higher than that of the supply service and to pump current back into the supply line until torque equilibrium between armatures 14 and 17 is restored.

Changes in motor load on the distribution network may occur at any time irrespective of changes in the voltage of the supply circuit, and at such time it is desirable to increase the network voltage so as to partly offset the i. r. drop in the armature winding of the motors caused by the increased load, thus maintaining the speed of the motors substantially constant. This is accomplished by differentially connecting the coil 20 of the voltage regulator which opposes the ampere turns of the coil 21 more strongly with increased load, necessitating an increase in the ampere turns of the coil 21 to maintain the resulting magneto motive force of the voltage regulating coils constant. It is thus apparent that the effect of increased current drawn by the distribution circuit is to set the regulating point of coil 21 for a higher voltage. The amount of the increase of voltage obtainable in this way may be varied by adjusting the point of connection of coil 20 to shunt 22.

Since coil 19 has a greater number of ampere turns than coil 18, it can therefore be regulated so as to have a greater, equal or less magneto motive force than coil 18 which is subject only to the slight variations in potential across the main supply leads. In actual operation, armature 31 is in constant vibration, as already noted, regulating the strength of coil 19 for the slightest change in the voltage or load of the distribution circuit, varying the voltage of armature 17 both in amount and polarity with great flexibility and responding to every minute degree of variation in the circuit within the limits of accuracy of the voltage regulator.

It should be understood that this invention is not limited to the use of the vibrating type of voltage regulator shown in the drawing. Any type of regulator which will automatically vary the ampere turns of field 19, may be used, or in the event of the failure of the regulator, resistance 30 may be operated by hand.

What is claimed is:

1. In combination with a system of electrical distribution, a shunt wound motor generator across the supply end of said system, a second motor generator mechanically connected to the first and connected to the load end of said system, said second machine having two differentially wound shunt fields, and means for controlling the current through one of said fields whereby said field may be stronger, equal to or weaker than the other.

2. In combination with a system of electrical distribution, a regulating system comprising a shunt wound motor generator across the supply end of said system, a second motor generator coupled with the first and connected in series with the load end of said system, two differentially wound shunt fields for said second motor generator, a voltage regulator in said load circuit serving to control the amount of current passing through one of said differential fields.

3. In a system of electrical distribution a main circuit and a branch circuit, a dynamo electric machine in shunt in the main circuit, a second dynamo electric machine in series in said branch circuit, a pair of differential shunt field windings for said last named machine, and means by which the strength and polarity of said machine may be controlled.

4. In a system of electrical distribution, a shunt wound dynamo electric machine, a second dynamo electric machine having differentially wound shunt field coils, means for controlling the voltage and polarity of said second dynamo electric machine comprising an electromagnetic switch device responsive to the voltage and load of the circuit in which said second dynamo electric machine is connected for controlling the current in one of said differential field coils.

5. In a system of electrical distribution, a main circuit and a branch circuit, means for regulating the voltage of the branch circuit comprising a shunt wound dynamo electric machine energized by the main circuit, a second dynamo electric machine energized in series with said branch circuit, two shunt fields for said second dynamo electric machine, and means in circuit with one of said shunt fields for automatically regulating the voltage in said field in accordance with the load and voltage in said branch circuit.

6. In an electrical system, a source of current and two main leads therefor, a dynamo electric machine in circuit across said leads, a branch circuit and two leads therefor, a second dynamo electric machine in series with one of said leads, said second machine having permanent mechanical connection with said first machine, a pair of fields for said second dynamo electric machine, means in the circuit of one of said fields responsive to the voltage and load in said circuit for controlling the energization of said field.

7. In a voltage regulating system, a supply circuit, a booster device comprising a pair of dynamo electric machines mechanically connected to each other, one of said machines being connected across said supply circuit, a shunt field winding for said machine, a distribution circuit, the second machine being connected in series in the distribution circuit, and having a pair of differentially wound shunt fields and an electromechanical device in circuit with one of said shunt fields, said device being responsive to the load and voltage of the distribution circuit.

8. In a voltage regulating system, a supply circuit, a dynamo electric machine connected across said supply circuit, a distribution circuit, a second dynamo electric machine coupled to the first and connected in series in said distribution circuit, a pair of differential shunt field windings for said second machine, an electromechanical device in circuit with one of said windings, whereby the current in said winding is controlled by means responsive to the load and voltage of said distribution circuit.

9. In a direct current electrical distributing system, a main circuit, a feeder circuit, an electrical balancing system for said feeder circuit comprising a shunt wound dynamo electric machine having its field energized by said main circuit, a second dynamo electric machine mechanically connected to the first, a pair of differential shunt field windings for said second machine, one of said windings being energized from the main circuit, the second of said windings energized from said feeder circuit and electromechanical means responsive to the voltage and load of the feeder circuit for determining the energization of the second differential field.

10. In an electrical distributing system, a supply circuit and a distribution circuit, a reciprocating booster system in said distributing circuit comprising a dynamo electric machine energized by said supply circuit, a second dynamo electric machine mechanically connected thereto and energized in series with said distribution circuit, a pair of differential shunt field coils for said second machine, means for cutting resistance into and out of the circuit of one of said coils according as the voltage of said main circuit is above or below that of the distribution circuit.

In witness whereof, I hereunto subscribe my name this 22nd day of August A. D., 1921.

FRANK W. MERRILL.